United States Patent
Hamberg et al.

(10) Patent No.: US 6,671,363 B2
(45) Date of Patent: Dec. 30, 2003

(54) TELECOMMUNICATIONS NETWORK WITH GENERIC ANALYSIS MECHANISM

(75) Inventors: Max Hamberg, Vantaa (FI); Osmo Timonen, Espoo (FI)

(73) Assignee: Nokia Corporation, Espoo (FI)

(*) Notice: Subject to any disclaimer, the term of this patent is extended or adjusted under 35 U.S.C. 154(b) by 301 days.

(21) Appl. No.: 09/876,559

(22) Filed: Jun. 7, 2001

(65) Prior Publication Data

US 2001/0043693 A1 Nov. 22, 2001

Related U.S. Application Data

(63) Continuation of application No. PCT/FI99/01013, filed on Dec. 7, 1999.

(30) Foreign Application Priority Data

Dec. 9, 1998 (FI) .................................................. 982669

(51) Int. Cl.[7] .......................... H04M 3/42; H04M 3/00; H04M 5/00
(52) U.S. Cl. .................................. 379/201.03; 379/242
(58) Field of Search ........................ 379/201.02, 201.03, 379/114.01, 219, 220.01, 229, 221.15, 221.06, 221.07

(56) References Cited

U.S. PATENT DOCUMENTS

| | | | |
|---|---|---|---|
| 4,017,689 A | 4/1977 | Richards et al. | 379/234 |
| 5,553,127 A | 9/1996 | Norell | 379/201.02 |
| 5,774,538 A | 6/1998 | Onishi | 379/242 |

FOREIGN PATENT DOCUMENTS

| | | |
|---|---|---|
| JP | 1-227552 | 9/1989 |
| WO | WO 94/11996 | 5/1994 |
| WO | WO 98/27750 | 6/1998 |
| WO | WO 98/39935 | 9/1998 |

*Primary Examiner*—Benny Tieu
(74) *Attorney, Agent, or Firm*—Squire, Sanders & Dempsey L.L.P.

(57) ABSTRACT

The present invention relates to a system and a method for the optimization of an analysis, said system comprising a telecommunication network and analysis means for analyzing data associated with calls. According to the invention, the analysis means comprise a generic analysis mechanism and one or more analysis functions utilizing the analysis mechanism. The invention makes it possible to avoid inter-penetrating analysis implementations, thus reducing the costs.

6 Claims, 4 Drawing Sheets

TELECOMMUNICATIONS NETWORK WITH GENERIC ANALYSIS MECHANISM

This application is a continuation of PCT/FI99/01013 filed on Dec. 7, 1999.

FIELD OF THE INVENTION

The present invention relates to telecommunication. In particular, the invention concerns a new and advanced method and system for optimizing an analysis in a telecommunication network.

BACKGROUND OF THE INVENTION

In telecommunication networks, various analyses are performed in which the basic principle is to obtain unambiguous result date associated with input data to be analyzed, said output data being obtained as a result of the analysis. Such analyses are used e.g. to find call destination information associated with a dialling and various origin information, to select an appropriate route to the destination and to conclude on what basis the metering is to be performed on the selected route.

An analysis proceeding on the basis of a numeric sequence is generally implemented using an analysis tree. The analysis tree is a commonly known data structure that allows very fast retrieval of a result record on the basis of a numeric key.

A problem with prior-art solutions is that, although the analyses performed are quite similar to each other, each analysis type is implemented as a completely separate entity. These analysis types include e.g. dialling analysis, which is used to select an appropriate route to the destination; subscriber number analysis, which is used to find call destination information associated with the dialling and various origin information; and metering analysis, which is used to conclude on what basis the metering is to be performed on the selected route. At present, each of these is implemented as a separate entity. A consequence of this is that there are interpenetrating functions in use, and this again gives rise to extra costs. A further problem is the difficulty of defining an application interface with respect to the analysis software, which makes it difficult to achieve uniform software design and thus gives rise to additional costs.

The object of the invention is to disclose a new type of method that will eliminate the problems referred to above. A specific object of the invention is to disclose a system and a method for the optimization of an analysis in a telecommunication network.

BRIEF DESCRIPTION OF THE INVENTION

The system of the invention for optimizing an analysis comprises a telecommunication network, such as a wired telephone network, mobile communication network, ISDN network or a combination of these; and analysis means for analyzing data associated with calls, such as routing and metering data. According to the invention, the analysis means comprise a generic analysis mechanism which performs an analysis by going through an analysis tree. 'Generic' refers to a general applicability such that one and the same entity can be utilized by a plurality of parties and/or for different purposes without this entity having to be modified. The analysis mechanism does not understand the meaning of the data being processed by it but simply knows how to process the data, in other words, the mechanism is implemented e.g. so that it can know the type of the data being processed but does not know what this data of a certain type means. Several analysis trees may be in use simultaneously, and they can be used for different purposes. Thus, the analysis mechanism is a general-purpose functional entity which, once implemented, can be utilized again and again in different situations. Further, according to the invention, the analysis means comprise one or more analysis functions utilizing the analysis mechanism, which understand the meaning of the data produced by the mechanism and are able to utilize the result information.

In an embodiment of the invention, the analysis mechanism is implemented in conjunction with the switching platform of the telecommunication network, which is e.g. a narrow band switching platform. However, it is to be noted that the switching platform may also be a wide band platform.

In an embodiment of the invention, each analysis function is implemented in conjunction with the telecommunication network component to which it logically belongs. For instance, subscriber number analysis is implemented in conjunction with the fixed network, whereas dialling analysis is implemented in conjunction with the narrow band switching platform.

As compared with prior art, the present invention has the advantage that it makes it possible to optimize the implementation of an analysis in telecommunication networks. As the general-purpose analysis mechanism and the actual analysis functions are separated from each other, interpenetrating implementations typical of prior-art solutions are avoided, thus reducing the costs. The interpenetrating implementations referred to are a consequence of the fact that, at present, each analysis type is implemented as a separate entity, in other words, even the entity consisting of the generic analysis mechanism of the invention is implemented separately for each analysis type. Further, the invention makes it easier to define an application interface with respect to the analysis software, thus allowing easier and more clear-cut software design. A further advantage of the invention is that subscriber number analysis can be transferred to a fixed network application, which is where it logically belongs, while dialling analysis and the analysis mechanism are part of e.g. a narrow band switching platform. In prior-art solutions, both subscriber number analysis and ordinary dialling analysis must be regarded as parts of the narrow band switching platform because they are strictly tied to a number analysis mechanism going through an analysis tree. Moreover, the invention has the advantage that the metering analysis function can be developed in conjunction with the functional entity of metering, in other words, in the metering expertise area, thus allowing a unitary metering entity to be achieved.

LIST OF ILLUSTRATIONS

In the following, the invention will be described by the aid of a few examples of its embodiments with reference to the attached drawing, in which FIG. 1 is a diagrammatic illustration of an implementation of the system of the invention;

DETAILED DESCRIPTION OF THE INVENTION

Figure 1:
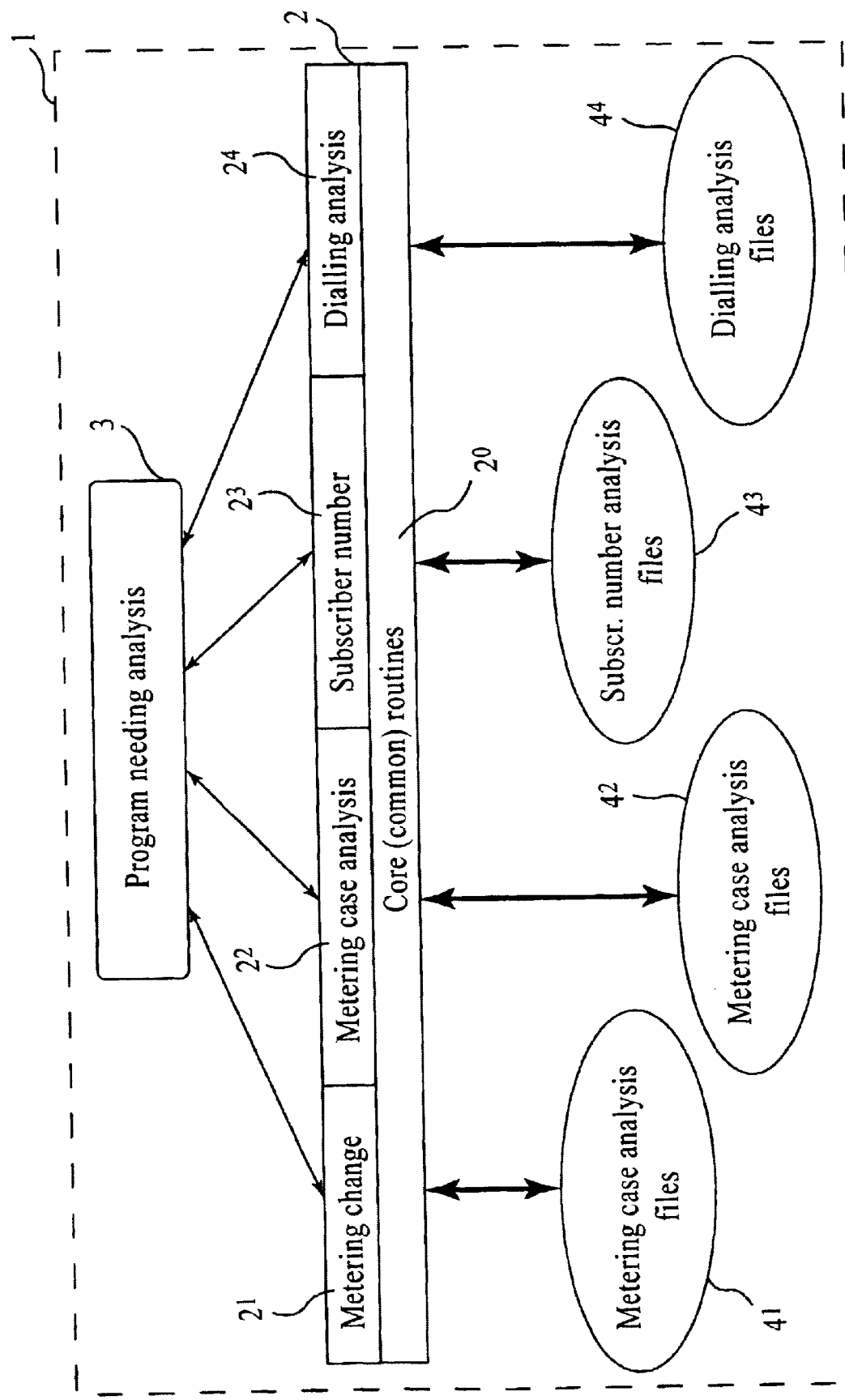

FIG. 1 presents the components of a system according to the invention in diagrammatic form. The system comprises a telecommunication network 1, which is e.g. a public switched telephone network, ISDN network, GSM network or a combination of these. Moreover, be system comprises analysis means 2. According to the invention, the analysis means 2 are logically divided into two separate parts. Separated from each other e.g. as libraries, there are a generic analysis mechanism $2^0$ and a number of analysis functions, such as metering change $2^1$, metering case analysis $2^2$, subscriber number analysis $2^3$ and dialling analysis $2^4$. A program 3 which needs an analysis functions as a customer using the services provided by the analysis means 2. The data used as basic information for analysis and the data obtained as a result of analysis are stored e.g. in metering change files $4^1, 4^2, \ldots, 4^N$.

The analysis mechanism $2^0$ is a general-purpose functional entity which, once implemented, can be utilized again and again to perform different functions $2^1, 2^2, 2^3$. The mechanism $2^2$ does not know the meaning of the data processed by it. The analysis mechanism $2^0$ performs the analysis by going through an analysis tree. The analysis tree is a commonly known data structure that allows very fast retrieval of a result record on the basis of a numeric key. Several analysis trees may be in use simultaneously, and they can be used for different purposes. From the origin data, such as subscriber data, the system can conclude which tree is to be used to analyze the dialling in each case.

The analysis mechanism $2^0$ may be implemented e.g. as a collection of core routines, i.e. as a software library containing e.g. the software routines required for the execution of the analysis mechanism as well as routines for error handling and debugging. The data used as a basis of analysis consists of e.g. metering change data $4^1$, metering case analysis files $4^2$, subscriber number analysis files $4^3$ and/or dialling analysis files $4^4$, which have been defined e.g. in conjunction with the initialization of the system. Physically, the analysis mechanism $2^0$ is preferably disposed in conjunction with the switching platform.

The basic idea in the analysis functions $2^1, 2^2, 2^3, 2^4$ is to find unambiguous result information associated with the analysis input data, obtained as a result of the analysis function. They are used e.g. to find call destination data associated with the dialling and various origin data, to select an appropriate route to the destination and to conclude on what basis the billing is to be generated on the selected route. Unlike the mechanism $2^0$, the analysis functions $2^1, 2^2, 2^3, 2^4$ understand the meaning of the data being processed.

The analysis functions, too, can be implemented as software libraries comprising the required routines. The analysis functions comprise e.g. a metering change function $2^1$, which comprises routines for the processing of the metering change analysis and its results. Metering change is a sub-area of metering analysis, designed to determine what changes need to be made in the metering data.

In a corresponding manner, e.g. metering case analysis $2^2$, subscriber number analysis $2^3$ and dialling analysis $2^4$ can be implemented as software libraries containing routines. Metering case analysis $2^2$ is used to establish the metering data.

In a physical sense, each analysis function is preferably implemented in conjunction with the component of the telecommunication network 1 to which it logically belongs. This means that e.g. the subscriber number analysis $2^3$ is physically disposed in a wired-network application, whereas the dialling analysis $2^4$ is e.g. part of the switching platform.

Figure 2:
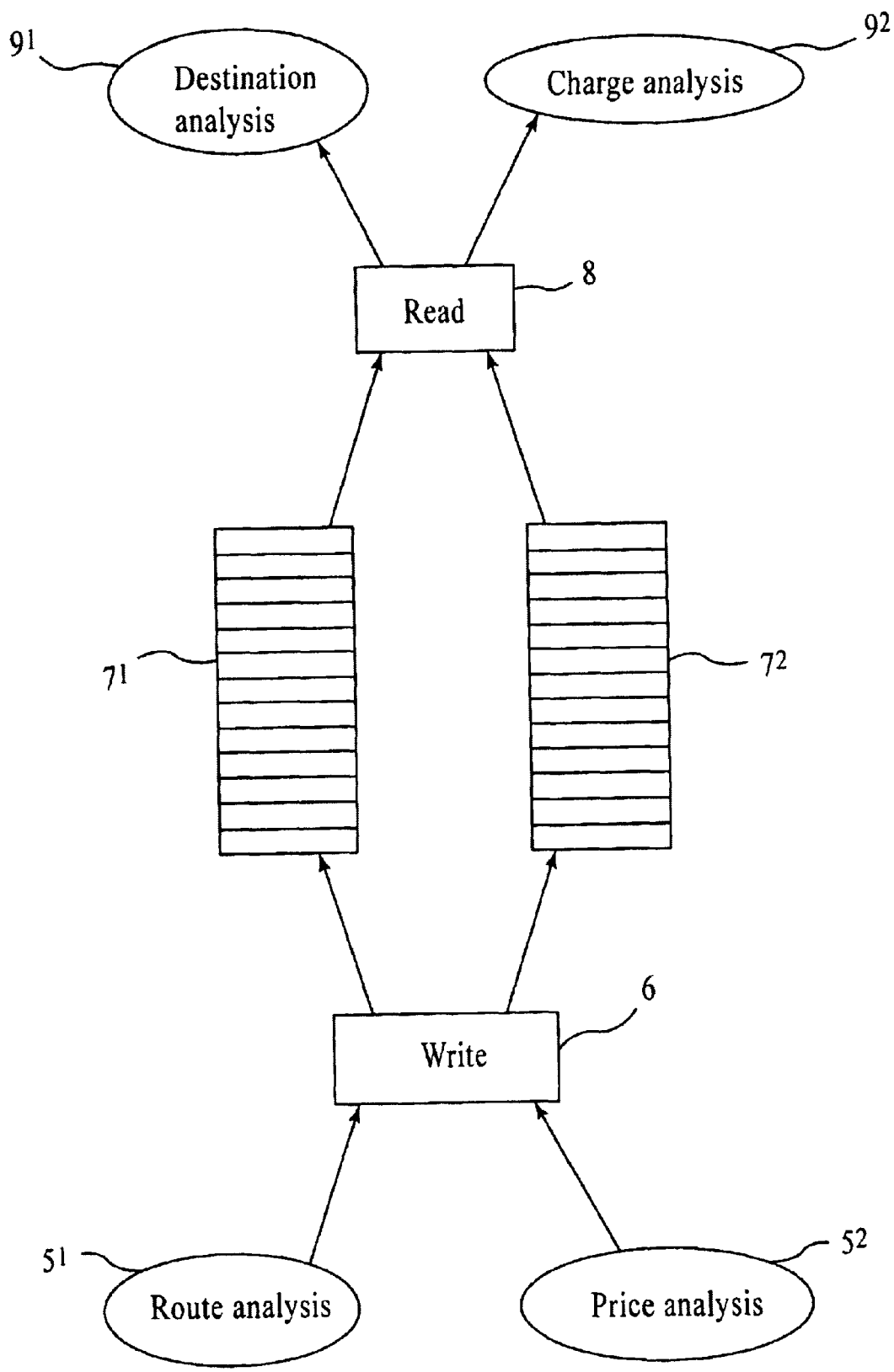
FIG. 2 is a diagrammatic illustration of an implementation of the system of the invention.

FIG. 2 presents a diagrammatic illustration of an implementation of the system of the invention. The data obtained as a result of routing analysis $5^1$ is stored in a file $7^1$ using a generic writing mechanism 6. When a destination analysis function $9^1$ needs this data, it retrieves it from the file $7^1$ by using a generic reading mechanism 8. Correspondingly, data obtained as a result of price analysis $5^2$ is stored in a file $7^2$ by using the generic writing mechanism 6. When a charge analysis function $9^2$ needs this data, it retrieves it from the file $7^2$ by using the generic reading mechanism 8. Thus, the invention makes it possible to for both the routing analysis $5^1$ and the price analysis $5^2$ to use the same mechanism for writing the data to the storage. Similarly, the invention allows the destination analysis $9^1$ and the charge analysis $9^2$ to use a common mechanism for reading the data.

Figure 3A:
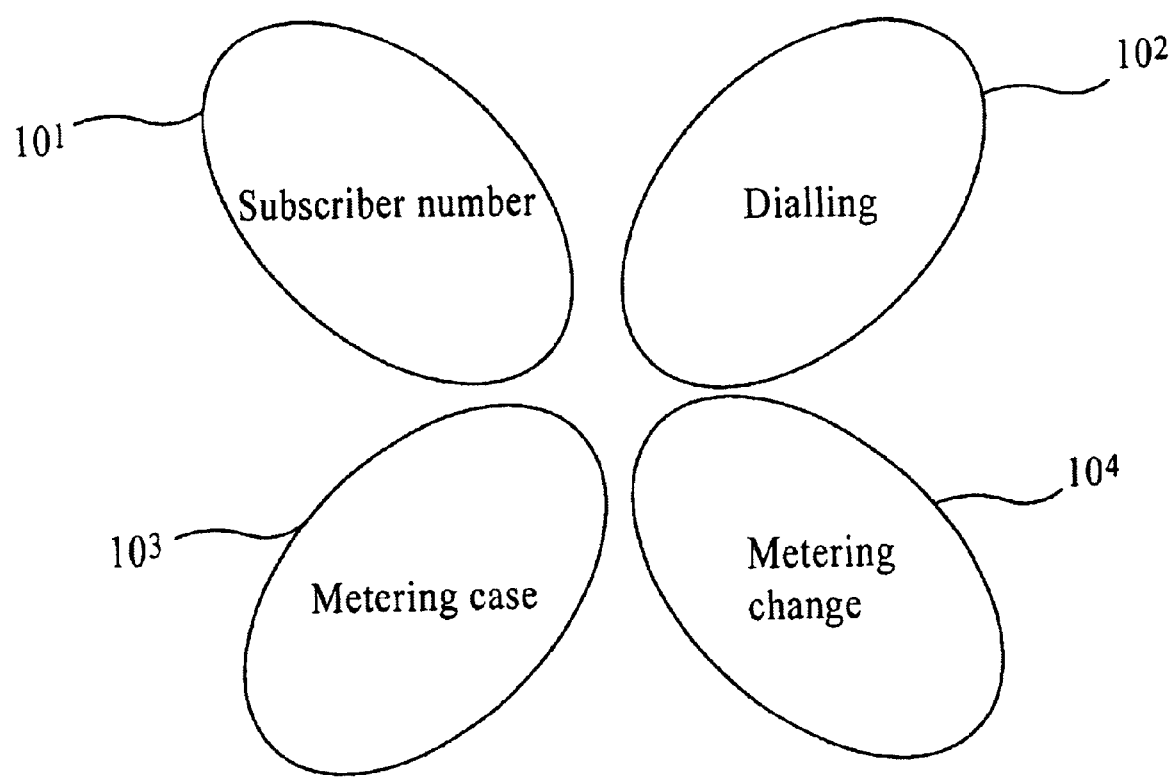
FIG. 3a illustrates a prior-art implementation and FIG. 3b is a diagrammatic illustration of an implementation of the system of the invention.
Figure 3B:
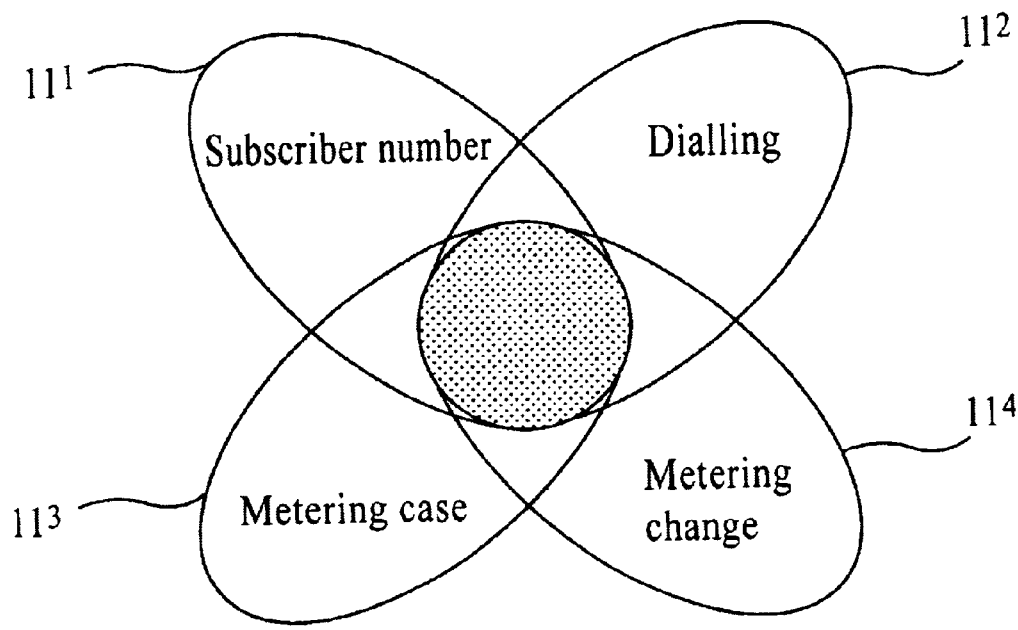

In FIGS. 3a and 3b, an implementation of the system of the invention and a prior-art implementation are compared. FIG. 3a illustrates an example of a prior-art solution. In this case, subscriber number analysis $10^1$, dialling analysis $10^2$, metering case analysis $10^3$ and metering change $10^4$ are each implemented as completely separate functions. On the other hand, FIG. 3b presents an example illustrating a solution according to the present invention. In this case, subscriber number analysis $11^1$, dialling analysis $11^2$, metering case analysis $11^3$ and metering change $11^4$ are implemented in a manner allowing these functions to use common core functions.

Figure 4:
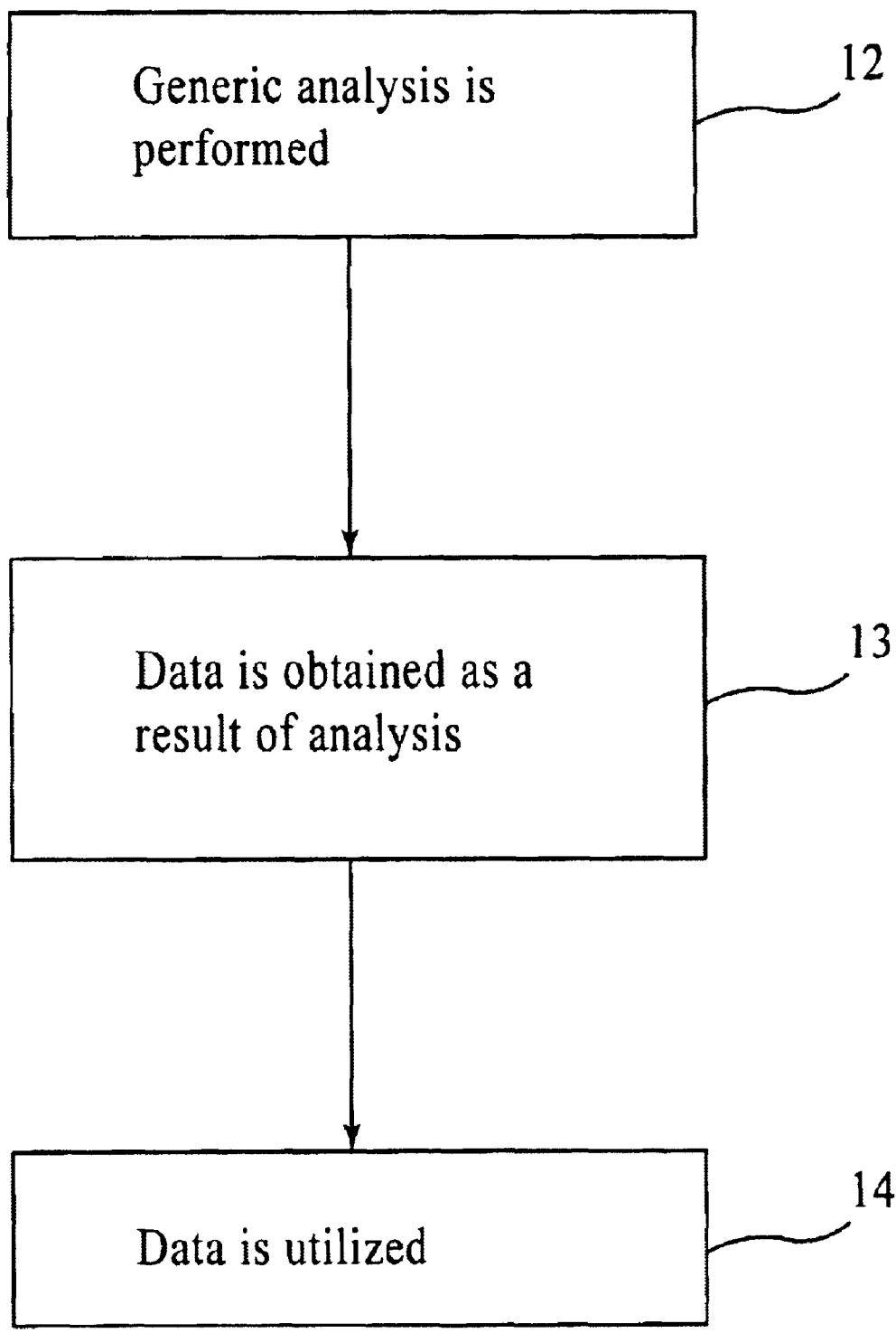
FIG. 4 is a diagrammatic illustration of an implementation of the method of the invention.

FIG. 4 presents a diagram illustrating a method according to the invention. Using a generic analysis mechanism, an analysis is performed, block 12, by the aid of an analysis tree. Next, block 13, as a result of the analysis performed, desired data is obtained, depending on the initial data supplied for analysis. Next, block 14, the data obtained as a result of the analysis is utilized in analysis functions.

The invention is not restricted to the examples of its embodiments described above, but many variations are possible within the scope of the inventive idea defined in the claims.

What is claimed is:

1. System for the optimization of an analysis, said system comprising a telecommunication network and analysis means for analyzing data associated with calls, wherein the analysis means comprise a generic analysis mechanism, which performs an analysis using an analysis tree, but which does not understand the meaning of the data being processed by it; and one or more analysis functions which utilize the analysis mechanism and understand the meaning of the data they are processing and are able to utilize the data obtained as a result of the analysis.

2. System as defined in claim 1, wherein the analysis mechanism is implemented in conjunction with the telecommunication network.

3. System as defined in claim 1, wherein each analysis function is implemented in conjunction with that component of the telecommunication network to which it logically belongs.

4. Method for the optimization of an analysis, in which method data associated with calls is analyzed using analysis means in a telecommunication network, wherein the analysis is performed by a generic analysis mechanism using an analysis tree, said analysis mechanism being unable to understand the meaning of the data being processed by it; and the analysis mechanism is utilized by one or more analysis functions which understand the meaning of the data being processed by the analysis mechanism and are able to utilize the data obtained as a result of the analysis.

5. Method as defined in claim 4, wherein the analysis mechanism is implemented in conjunction with the switching platform of the telecommunication network.

6. Method as defined in claim 4, wherein each analysis function is implemented in conjunction with that component of the telecommunication network to which it logically belongs.

* * * * *